United States Patent [19]
Elkins et al.

[11] Patent Number: 5,680,586
[45] Date of Patent: Oct. 21, 1997

[54] METHOD AND SYSTEM FOR STORING AND ACCESSING USER-DEFINED ATTRIBUTES WITHIN A DATA PROCESSING SYSTEM

[75] Inventors: Douglas G. Elkins, Plantation; James Richard Schoech, Lake Worth; James Gregory Wahlig, Boca Raton, all of Fla.

[73] Assignee: International Business Machines Corporation, Armonk, N.Y.

[21] Appl. No.: 424,031

[22] Filed: Apr. 18, 1995

[51] Int. Cl.⁶ .................................................... G06F 13/00
[52] U.S. Cl. .................. 395/500; 395/601; 395/611; 395/619; 395/682; 395/712
[58] Field of Search ................................ 395/500, 600, 395/650, 700, 682, 601, 611, 619, 712

[56] References Cited

U.S. PATENT DOCUMENTS

| | | | |
|---|---|---|---|
| 4,864,497 | 9/1989 | Lowry et al. | 395/613 |
| 5,047,918 | 9/1991 | Schwartz et al. | 395/619 |
| 5,261,098 | 11/1993 | Katin et al. | 395/601 |
| 5,287,500 | 2/1994 | Stoppani, Jr. | 395/610 |
| 5,327,529 | 7/1994 | Fults et al. | 395/335 |
| 5,355,491 | 10/1994 | Lawlor et al. | 395/707 |
| 5,361,349 | 11/1994 | Sugita et al. | 395/608 |
| 5,367,671 | 11/1994 | Feigenbaum et al. | 395/601 |
| 5,504,892 | 4/1996 | Atsatt et al. | 395/614 |
| 5,530,845 | 6/1996 | Hiatt et al. | 395/500 |
| 5,537,592 | 7/1996 | King et al. | 395/616 |
| 5,551,020 | 8/1996 | Flax et al. | 395/612 |
| 5,557,798 | 9/1996 | Skeen et al. | 395/235 |

Primary Examiner—Kevin J. Teska
Assistant Examiner—Nicole L. Dehlitsch-Moats
Attorney, Agent, or Firm—Bruce J. Jobse; Brian F. Russell; Andrew J. Dillon

[57] ABSTRACT

A method and system are disclosed for associating a file descriptor with a selected file within a data processing system that has multiple diverse operating systems, a number of diverse incompatible file systems, and a single file service which controls access by the operating systems to the file systems. When a request for file services, which specifies a file descriptor to be associated with a selected file, is received from a particular operating system in a format specific to that particular operating system, the file descriptor is converted into a nonspecific format utilized by the file service which includes an indication of the specific format utilized by the particular operating system. The file descriptor is examined to determine a destination file system and is then transmitted to that file system. If the destination file system supports the nonspecific format, the file descriptor is stored within the destination file system in association with the selected file. If the destination file system does not support the nonspecific format, it is determined if the destination file system supports the specific format utilized by the particular operating system. In response to determining that the destination file system supports the specific format, the file descriptor is translated into the specific format and stored within the destination file system in association with the selected file. If the destination file system does not support the specific format, the particular operating system is notified that the file descriptor was not associated with the selected file.

11 Claims, 6 Drawing Sheets

```
typedef struct fs_usrattr {
    unsigned long   next_ua;        /*offset to next usrattr   */
    unsigned short  name_len;       /*length of name           */
    unsigned short  user_type;      /*enumerated user-type     */
    unsigned short  system_type;    /*enumerated system-type   */
    fs_len_t        value_len;      /*length of value          */
    Unichar         name[];         /*name                     */
    unsigned char   value[];        /*value                    */
}fs_usrattr_t;
```

Fig. 5

METHOD AND SYSTEM FOR STORING AND ACCESSING USER-DEFINED ATTRIBUTES WITHIN A DATA PROCESSING SYSTEM

BACKGROUND OF THE INVENTION

1. Technical Field

The present invention relates in general to a method and system for improved data processing and in particular to an improved method and system for storing and accessing user-defined attributes associated with data files within a data processing system. Still more particularly, the present invention relates to an improved method and system for storing and accessing user-defined attributes within a data processing system having a number of operating system clients.

2. Description of the Related Art

Within data processing systems, data files stored on physical media, such as hard disk, optical disk or other direct access storage device (DASD) files, are generally associated with a standard set of attributes describing certain characteristics of the file and its location in storage. For example, a standard attribute set for a data file may consist of the file name, the date and time of last access to the data file, the date and time of last revision of the data file, modification permissions (read only or modify), and information specifying the position in storage of the data file. Data files and associated standard attributes are created by and revisable by application programs. Storage of data files and their associated standard attributes is typically managed by the operating system in a linked manner, so that data files and their associated standard attributes are accessible to the operating system and other applications as if they were a single entity, even though they may be stored at noncontiguous locations on the physical media.

In addition to standard attributes, an application program may create or revise user-defined attributes which specify additional information about the associated data file. User-defined attributes typically comprise a tuple specifying a name, type, and value for the user-defined attribute; however, the specific format for a user-defined attribute varies between operating systems.

To create a user-defined attribute, a user invokes an application that provides facilities for defining a user-defined attribute and associating it with a data file stored on a physical media. After the user supplies the requisite information, the application transmits an application program interface (API) message to the operating system of the data processing system, specifying the user-defined attribute in the particular format utilized by the operating system. The operating system software then transmits the user-defined attribute to the file system which stores the associated data file. Finally, the file system stores the user-defined attribute on the physical media (i.e., within the DASD file) in association with the specified data file. As will be understood by those skilled in the art, a particular file system such as a file allocation table (FAT) or high performance file system (HPFS) does not support all user-defined attribute formats. Thus, for example, FAT and HPFS support user-defined attributes which are in the OS/2 Extended Attribute format, but do not support other user-defined attribute formats such as Resource Forks utilized by Macintosh computers.

Although the conventional method to associate a user-defined attribute with a data file on physical media described above performs efficiently within data processing systems having a single operating system, a problem arises in data processing systems which have a number of operating system clients. Because the conventional file service that routes user-defined attributes to the appropriate physical file system recognizes only user-defined attributes and commands which are in the format of a particular operating system, a conventional file service cannot be utilized to store and access user-defined attributes within a data processing system which has multiple operating system clients.

Consequently, it would be desirable to provide an improved method and system for storing and accessing user-defined attributes which supports a number of different operating system clients.

SUMMARY OF THE INVENTION

It is therefore one object of the present invention to provide an improved method and system for data processing.

It is another object of the present invention to provide an improved method and system for storing and accessing user-defined attributes associated with data files within a data processing system.

It is yet another object of the present invention to provide an improved method and system for storing and accessing user-defined attributes within a data processing system having a number of operating system clients.

The foregoing objects are achieved as is now described. A method and system are disclosed for associating a file descriptor with a selected file within a data processing system that has multiple diverse operating systems, a number of diverse incompatible file systems, and a single file service which controls access by the operating systems to the file systems. When a request for file services, which specifies a file descriptor to be associated with a selected file, is received from a particular operating system in a format specific to that particular operating system, the file descriptor is converted into a nonspecific format utilized by the file service which includes an indication of the specific format utilized by the particular operating system. The file descriptor is examined to determine a destination file system and is then transmitted to that file system. If the destination file system supports the nonspecific format, the file descriptor is stored within the destination file system in association with the selected file. If the destination file system does not support the nonspecific format, it is determined if the destination file system supports the specific format utilized by the particular operating system. In response to determining that the destination file system supports the specific format, the file descriptor is translated into the specific format and stored within the destination file system in association with the selected file. If the destination file system does not support the specific format, the particular operating system is notified that the file descriptor was not associated with the selected file.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 illustrates a preferred embodiment of a data structure utilized by the present invention to store the user-defined attribute in a generic format on a physical media.

DETAILED DESCRIPTION OF PREFERRED EMBODIMENT

Figure 1:
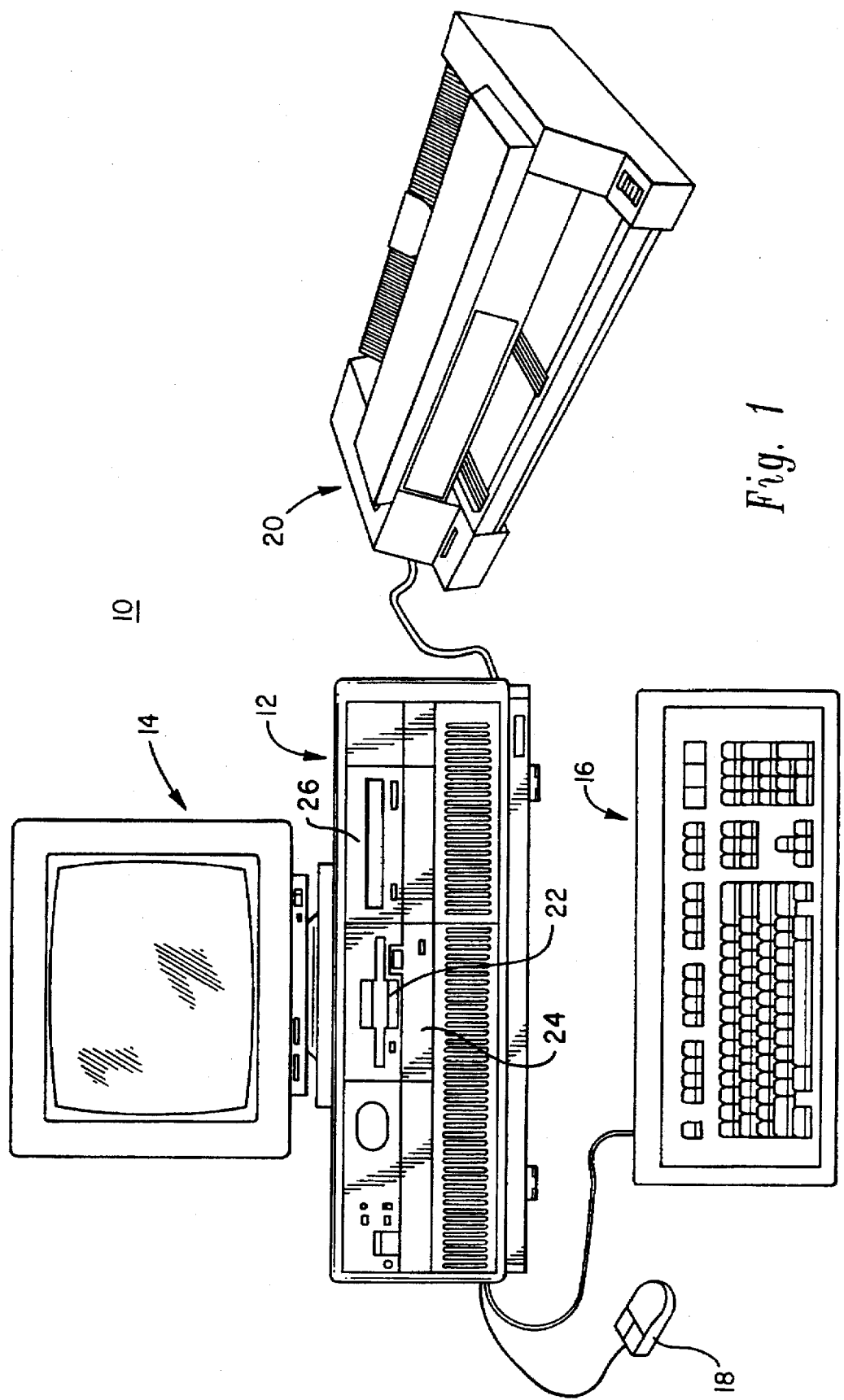
FIG. 1 illustrates a preferred embodiment of a data processing system which employs the method and system of the present invention.

With reference now to the figures and in particular with reference to FIG. 1, there is illustrated a preferred embodiment of a data processing system utilizing the method and system of the present invention. As illustrated, data processing system 10 includes system unit 12, display device 14, keyboard 16, mouse 18, and printer 20. As is well-known in the art, a user may input data to system unit 12 utilizing keyboard 16 or mouse 18, which are connected to system unit 12 via port A and port B connectors on the rear surface of system unit 12 (not illustrated). System unit 12 outputs data to a user via display device 14 or printer 20. As depicted, system unit 12 includes floppy disk drive 22, hard disk drive 24, and optical disk drive 26. As will be described in greater detail below, each of a number of operating system clients supported by data processing system 10 can store user-defined attributes in association with a data file on one of floppy disk drive 22, hard disk drive 24, and optical disk drive 26.

Figure 2:
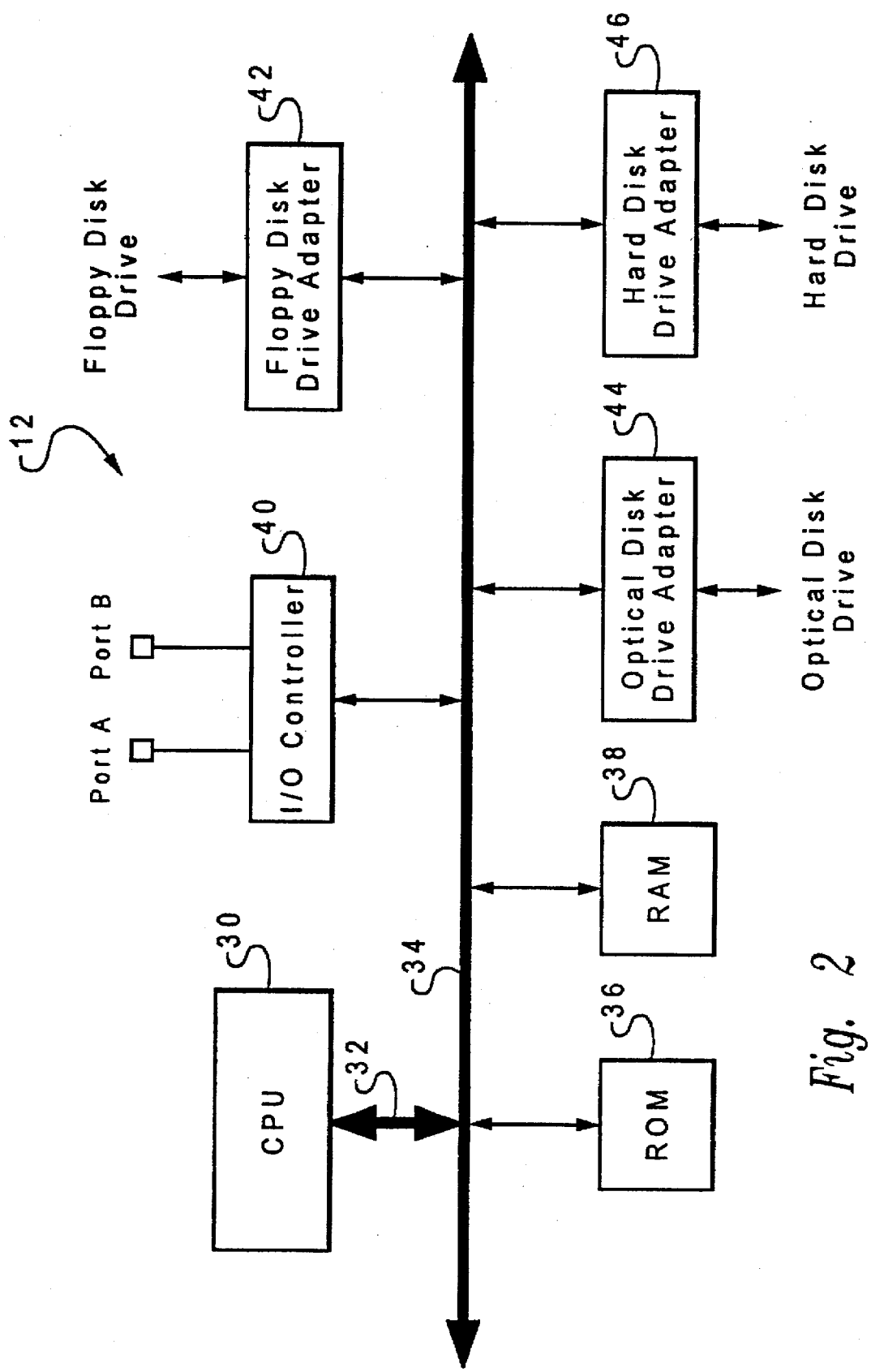
FIG. 2 depicts a block diagram of the system unit of the data processing system illustrated in FIG. 1.

Referring now to FIG. 2, there is depicted a block diagram of system unit 12. As illustrated, system unit 12 includes central processing unit (CPU) 30, which in a preferred embodiment of the present invention comprises one of the PowerPC RISC microprocessors available from IBM Microelectronics. CPU 30 is coupled via local bus 32 and system bus 34 to read only memory (ROM) 36, random access memory (RAM) 38, input/output (I/O) controller 40, floppy disk drive adapter 42, optical disk drive adapter 44, and hard disk drive adapter 46. Each of adapters 42–46 converts control and data signals transmitted by CPU 30 via system bus 34 to signals which can be utilized by its associated DASD. Like many conventional data processing systems, ROM 36 provides nonvolatile storage for software instructions utilized to control many fundamental operations of data processing system 10. For example, ROM 36 stores Power On/Self Test (POST) code, an operating system loader (boot strap program), and Basic Input/Output System (BIOS) software whose operation is familiar to those skilled in the art. RAM 38 comprises a number of individual volatile memory modules which store segments of operating system and application software while power is supplied to data processing system 10. As will be understood by those skilled in the art, system unit 12 may contain additional devices (not illustrated) utilized to support additional features of data processing system 10 that are not relevant to understanding the present invention.

Figure 3:
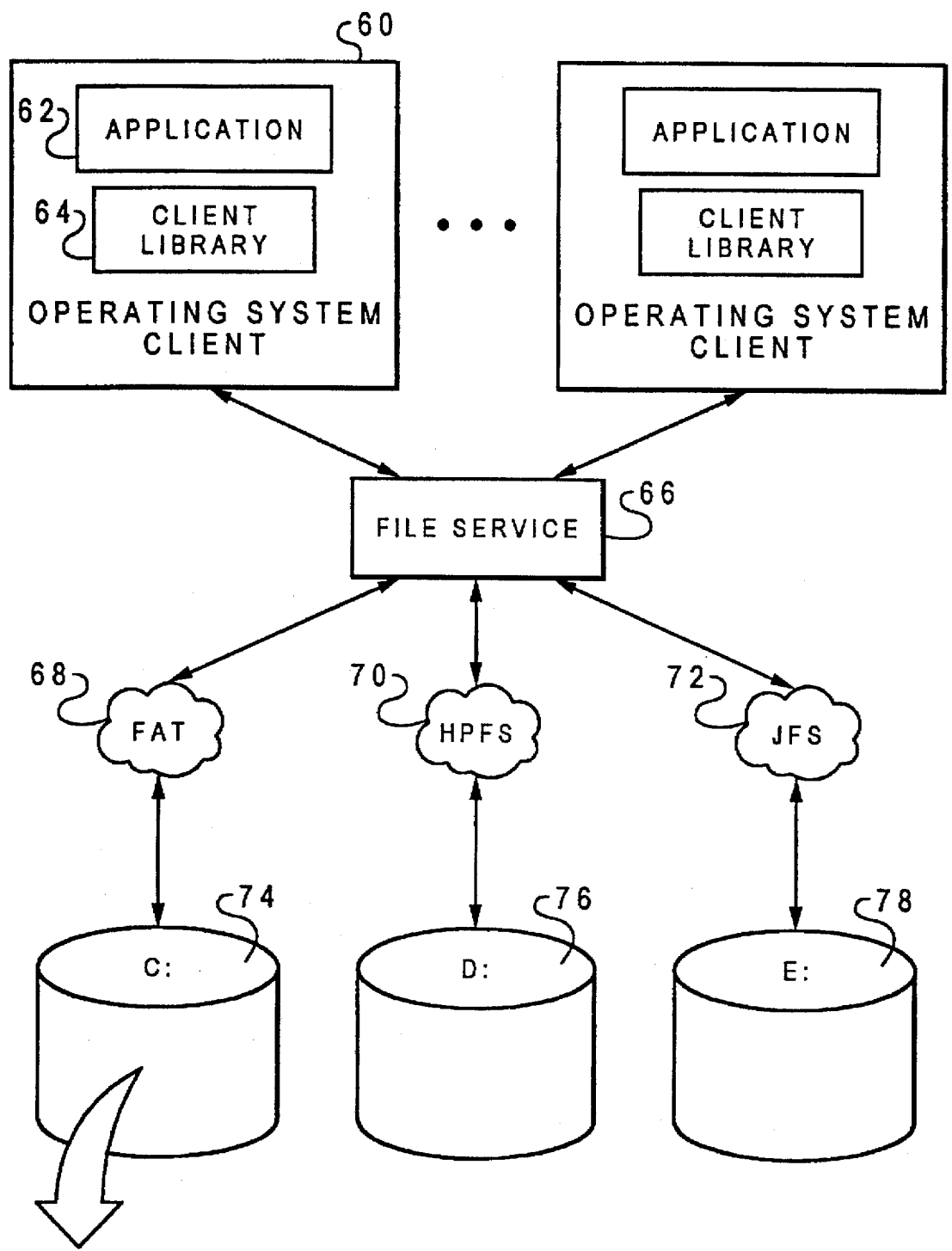
FIG. 3 illustrates a block diagram detailing communication between multiple operating system clients and physical file systems according to the method and system of the present invention.

With reference now to FIG. 3, there is illustrated a block diagram depicting communication between each of a number of operating system clients within data processing system 10 and multiple DASD files according to the method and system of the present invention. After system unit 12 is booted utilizing POST code stored in ROM 36, segments of one or more operating system clients 60 are loaded from floppy disk drive 22, hard disk drive 24, or optical disk drive 26 to RAM 38. A selected operating system client 60 is then executed by CPU 30 to provide both a user interface to data processing system 10 and an interface from one or more application programs executed by CPU 30 to system level functions within data processing system 10. Each operating system client 60 includes an application 62, such as a word processing program, and a client library 64, which is a collection of low-level routines utilized to perform basic operations within data processing system 10, such as storing and retrieving data. According to the present invention, each client library 64 contains a routine utilized by its associated operating system client 60 to convert user-defined attributes from the format particular to operating system client 60 into a generic format recognized by file service 66.

As illustrated each operating system client 60 within data processing system 10 communicates to DASD files 74–78 via file service 66. After a request for file services by an application 62, for example, a request to store a user-defined attribute in association with a particular data file, has been translated by a routine within client library 64, the request is transmitted to file service 66. File service 66 examines the request received from operating system client 60 and routes the request to the appropriate one of file systems 68–72. According to the present invention, file service 66 can support multiple diverse operating system clients, and in particular clients which utilize different formats of user-defined attributes. For example, operating system clients of file service 66 can include OS/2, UNIX, X-Windows, and System 7.5 for Macintosh.

File systems 68–72 represent the different formats utilized to store files and their associated user-defined attributes upon physical media. As will be understood by those skilled in the art, each of adapters 42–46 depicted in FIG. 2 may implement one or more of file allocation table (FAT) file system 68, high performance file system (HPFS) 70, journaling file system (JFS) 72, or other file systems. Thus, as depicted in FIG. 3, data stored on each of DASD files 74–78 are organized according to the specific format utilized by its associated file system 68–72; however, those skilled in the art will appreciate that in other embodiments of the present invention each of DASD files 74–78 may be partitioned to enable multiple file systems to be utilized on a single physical media.

Figure 4A:
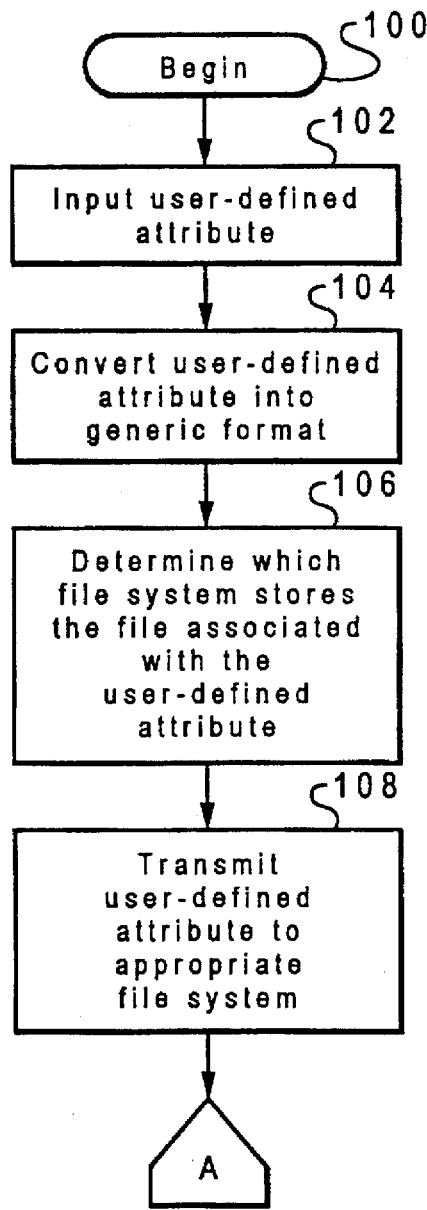
FIGS. 4A and 4B together comprise a flowchart depicting the method utilized by the present invention to store a user-defined attribute on a physical media.
Figure 4B:
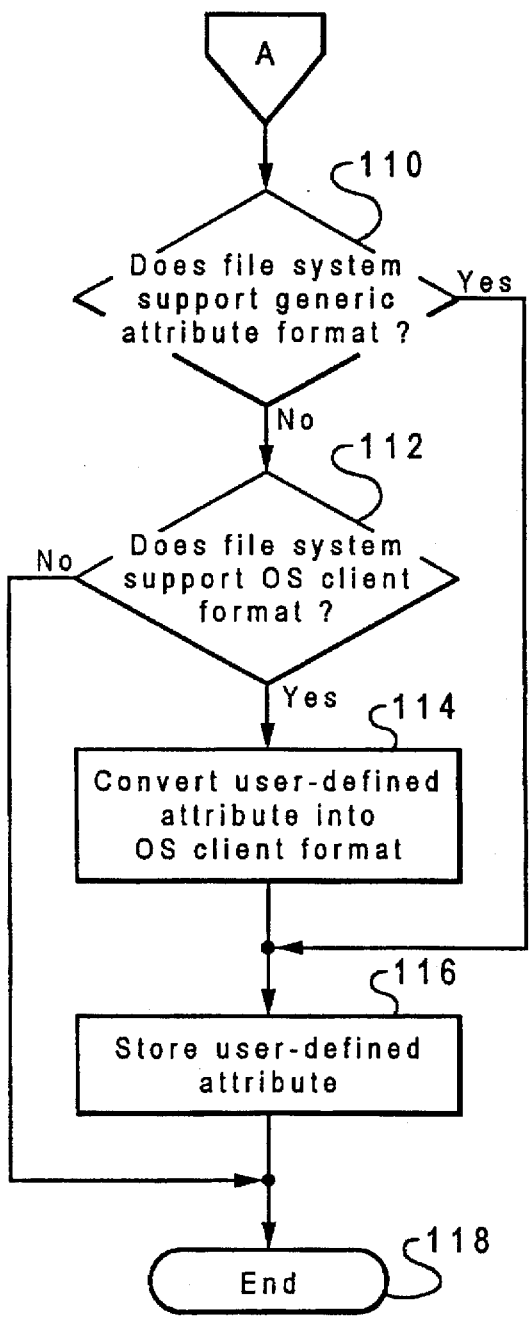

Referring now to FIGS. 4A and 4B, there is depicted a flowchart of the method utilized by the present invention to store a user-defined attribute in association with a data file stored on a DASD file. As illustrated, the process begins at block 100 and thereafter proceeds to block 102, which depicts a user, who is running an application 62 associated with one of operating system clients 60, inputting a user-defined attribute which the user desires to associate with a data file stored on one of DASD files 74–78. For example, assume the user desires to associate a name longer than those allowed by the standard DOS 8.3 format (i.e., one to eight character file name followed by a dot and a zero to three character extension) with a data file named C:FILE1 that is stored on DASD file 74. Since FAT file system 68 does not support file names longer than those allowed by the DOS 8.3 format, the user must create a user-defined attribute associated with FILE1 that contains the desired extended file name. Thus, at block 102 the user inputs a user-defined attribute called .LONGNAME that specifies a desired extended name of "MYDAILYPLANNER."

After the user has input the user-defined attribute specifying the desired extended name for FILE1, application 62 transmits the user-defined attribute to client library 64 utilizing an API message. As illustrated at block 104, client library 64 then converts the user-defined attribute from its original format, which is specific to operating system client 60, into a generic format utilized by file service 66. Because file service requests to file service 66 from operating system client 60 are formatted in a generic format, the present invention enables a single file service 66 to support file service requests from multiple diverse operating system clients. In a preferred embodiment of the present invention, the generic format for a user-defined attribute includes a name, a type, and a value. The type specifies both a system type, which describes the data structure of the user-defined attribute, and a user type, which provides an indication of the specific format utilized by operating system client 60. Thus, in the present example if operating system client 60 comprises OS/2 Warp, an operating system that utilizes a specific format of user-defined attributes called Extended Attributes (EAs), the generic format of the user-defined attribute would include a name of .LONGNAME, a system type of an uninterpreted byte array (i.e., text string), a user type of EA, and a value equal to "MYDAILYPLANNER."

Thereafter, the process proceeds from block 104 to block 106, which depicts file service 66 determining which of file systems 68-72 stores the data file with which the user desires to associate the user-defined attribute. In the present example, file service 66 examines the name of the user-defined attribute to determine that the selected file with which the user desires to associate the user-defined attribute is stored on DASD file 74. The process then proceeds to block 108, which depicts file service 66 transmitting the user-defined attribute to the appropriate one of file systems 68-72 in the generic format.

Continuing to block 110 of FIG. 4B, the process determines whether the file system selected at block 108 supports user-defined attributes stored in the generic format employed by file service 66. As will be appreciated by those skilled in the art, currently available file systems support only a subset of user-defined attribute formats, and some file systems will support additional formats such as the generic format employed by the current invention. However, in a preferred embodiment of the present invention, JFS 72 supports storing user-defined attributes to DASD file 78 in the generic format.

With reference now to FIG. 5, there is illustrated a preferred embodiment of a data structure utilized to store a user-defined attribute on a physical media in a generic format. As described above, the generic format of user-defined attributes employed by a preferred embodiment of the present invention comprises a name, a user type, a system type, and a value. The data structure depicted in FIG. 5 also includes an offset to the next user-defined attribute and fields which specify the length of the name and the length of the value.

Returning to FIG. 4B, if the selected file system supports the generic user-defined attribute format, the process proceeds to block 116. However, if the selected file system does not support the generic format, the process proceeds to block 112, which illustrates determining whether the selected file system supports the particular user-defined attribute format utilized by operating system client 60. The selected file system can easily determine whether the file system supports the specific user-defined attribute format utilized by operating system client 60 by examining the user type specified within the generic format. For example, FAT file system 68 (like HPFS 70) supports OS/2 EAs; however, FAT file system 68 does not support UNIX or Macintosh user-defined attributes. If at block 110 the process determines that the selected file system does not support the operating system-specific format of user-defined attribute, the process terminates at block 114 after notifying operating system client 60 that the user-defined attribute was not associated with the selected data file.

If, however, the selected file system does support the specific format of user-defined attribute, the process proceeds from block 112 to block 114, which illustrates the selected file system converting the user-defined attribute from the generic format in which it was received from file service 66 into the specific format utilized by operating system client 60. Thus, continuing the example, FAT file system 68 converts the user-defined attribute from the generic format into an EA. The process then proceeds from either block 110 or block 114 to block 116, which illustrates the file system storing the user-defined attribute on its associated physical media in association with the selected data file utilizing the user-defined attribute format particular to operating system client 60. Thereafter, the process terminates at block 118. As depicted in FIG. 3, at the completion of the process illustrated in FIGS. 4A and 4B, the user-defined attribute .LONGNAME is stored within DASD file 74 in association with FILE1.

Figure 6:
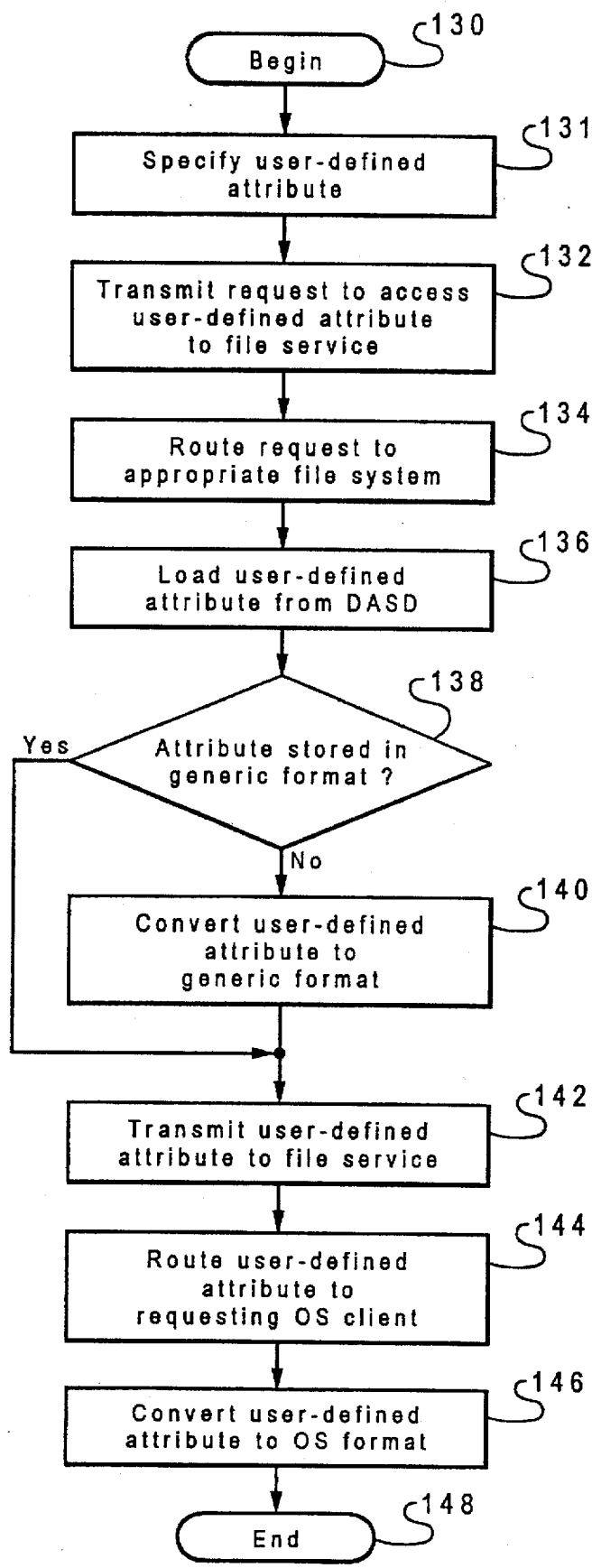
FIG. 6 is a flowchart depicting a method utilized by the present invention to access a user-defined attribute stored on a physical media.

Referring now to FIG. 6, there is depicted a flowchart of the method utilized by the present invention to access a user-defined attribute stored on a physical media. When the process begins at block 130, a user is executing an application 62 associated with an operating system client 60. As illustrated at block 131, utilizing facilities provided by application 62, the user specifies the name of a user-defined attribute stored within a DASD that the user desires to access. The process then proceeds to block 132, which depicts the request being transmitted from application 62 to operating system client 60 via an API message, and thereafter being forwarded to file service 66. As depicted at block 134, file service 66 then routes the access request to the appropriate one of file systems 68-72.

At block 136, the file system grants the request and reads the user-defined attribute from the file system's associated DASD file. The process proceeds from block 136 to block 138, which depicts determining whether the user-defined attribute was stored in the generic format utilized by file services 66. If the user-defined attribute was not stored utilizing the generic format, the process proceeds to block 140, which illustrates converting the user-defined attribute from the operating system-specific format in which it was stored into the generic format. Thereafter, the process proceeds from either block 138 or block 140 to block 142, which depicts the file system transmitting the user-defined attribute to file service 66. File service 66 routes the user-defined attribute to the requesting operating system client 60, as illustrated at block 144. Utilizing a suitable conversion routine within client library 66, operating system client 60 translates the user-defined attribute from the generic format into the operating system client-specific format utilized by operating system client 60 at block 146. The process then terminates at block 148.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system for associating a file descriptor with a selected file, said data processing system having a plurality of diverse operating systems, a plurality of diverse incompatible file systems, and a single file service which controls access by said plurality of diverse operating systems to said plurality of diverse incompatible file systems, said method comprising:

receiving from a particular operating system among said plurality of diverse operating systems a request for file services in a format specific to said particular operating system that specifies a file descriptor to be associated with a selected file;

converting said file descriptor into a nonspecific format utilized by said single file service, wherein said nonspecific format includes an indication of said format specific to said particular operating system;

examining said file descriptor within said single file service to determine a destination file system among said plurality of diverse incompatible file systems and transmitting said file descriptor to said destination file system; and if said nonspecific format is supported by said destination file system, storing said file descriptor within said destination file system in association with said selected file, wherein file services are provided for a plurality of diverse operating systems by a single file service.

2. The method for associating a file descriptor with a selected file of claim 1, and further comprising:

if said nonspecific format is not supported by said destination file system, determining if said format specific to said particular operating system is supported by said destination file system;

in response to determining that said format specific to said particular operating system is supported by said destination file system, translating said file descriptor from said nonspecific format into said format specific to said particular operating system; and storing said file descriptor within said destination file system in association with said selected file.

3. The method for associating a file descriptor with a selected file of claim 2, and further comprising:

in response to determining that said format specific to said particular operating system is not supported by said destination file system, notifying said particular operating system that said file descriptor was not associated with said selected file.

4. The method for associating a file descriptor with a selected file of claim 1, wherein said step of converting said file descriptor into a nonspecific format comprises converting said file descriptor into a format that specifies a file descriptor name, a file descriptor type which indicates said format specific to said particular file system, file descriptor data, and a structure of said file descriptor data.

5. A system for associating a file descriptor with a selected file within a data processing system, wherein operation of said data processing system is managed by a plurality of diverse operating systems, said system comprising:

a plurality of diverse incompatible file systems;

means, responsive to receipt, from a particular operating system among said plurality of diverse operating systems, of a request for file services, said request for file services being in a format specific to said particular operating system and specifying a file descriptor to be associated with a selected file, for converting said file descriptor into a nonspecific format utilized by said single file service, wherein said nonspecific format includes an indication of said format specific to said particular operating system;

a single file service which controls access by said plurality of diverse operating systems to said plurality of diverse incompatible file systems, wherein in response to receipt of a file descriptor in said nonspecific form, said single file service examines said file descriptor to determine a destination file system among said plurality of diverse incompatible file systems and transmits said file descriptor to said destination file system; and means for storing said file descriptor within said destination file system in association with said selected file if said nonspecific format is supported by said destination file system, wherein file services are provided for a plurality of diverse operating systems by a single file service.

6. The system for associating a file descriptor with a selected file of claim 5, and further comprising:

means for determining if said format specific to said particular operating system is supported by said destination file system if said destination file system does not support said nonspecific format;

responsive to determining that said format specific to said particular operating system is supported by said destination file system, means for translating said file descriptor from said nonspecific format into said format specific to said particular operating system; and means for storing said file descriptor within said destination file system in association with said selected file.

7. The system for associating a file descriptor with a selected file of claim 6, and further comprising:

means for notifying said particular operating system that said file descriptor was not associated with said selected file in response to determining that said format specific to said particular operating system is not supported by said file system.

8. The system for associating a file descriptor with a selected file of claim 5, wherein said nonspecific format of said file descriptor specifies a file descriptor name, a file descriptor type which indicates said format specific to said particular file system, file descriptor data, and a structure of said file descriptor data.

9. The system for associating a file descriptor with a selected file of claim 5, wherein said destination file system utilizes a file allocation table (FAT) to access information stored within said destination file system.

10. The system for associating a file descriptor with a selected file of claim 5, and further comprising at least one physical storage media, wherein each file system within a subset of said plurality of diverse incompatible file systems stores file descriptors in association with files on a single one of said at least one physical storage media.

11. A computer program product for associating a file descriptor with a selected file within a data processing system, wherein operation of said data processing system is managed by a plurality of diverse operating systems and said data processing system includes a plurality of diverse incompatible file systems, said computer program product comprising:

a computer-readable media having instruction code embodied therein, said instruction code including:

conversion code, responsive to receipt, from a particular operating system among said plurality of diverse operating systems, of a request for file services, said request for file services being in a format specific to said particular operating system and specifying a file descriptor to be associated with a selected file, for causing a data processing system to convert said file descriptor into a nonspecific format utilized by said single file service, wherein said nonspecific format includes an indication of said format specific to said particular operating system; and file service code which controls access by said plurality of diverse operating systems to said plurality of diverse incompatible file systems, wherein in response to receipt of a file descriptor in said nonspecific form, said single file service examines said file descriptor to determine a destination file system among said plurality of diverse incompatible file systems and transmits said file descriptor to said destination file system, wherein said destination file system stores said file descriptor in association with said selected file if said nonspecific format is supported by said destination file system.

* * * * *